(12) United States Patent
Suk et al.

(10) Patent No.: US 11,859,948 B2
(45) Date of Patent: Jan. 2, 2024

(54) OPERATING DEVICE AND METHOD FOR REMOTE CONTROL OF ARMING DEVICE

(71) Applicant: HANWHA AEROSPACE CO., LTD., Changwon-si (KR)

(72) Inventors: Bong Kyung Suk, Changwon-si (KR); Young Jin Seo, Changwon-si (KR); Jong Min Lee, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 582 days.

(21) Appl. No.: 16/943,557

(22) Filed: Jul. 30, 2020

(65) Prior Publication Data

US 2021/0239835 A1 Aug. 5, 2021

(30) Foreign Application Priority Data

Feb. 4, 2020 (KR) .......................... 10-2020-0013307

(51) Int. Cl.
*F41G 3/06* (2006.01)
*G01S 17/18* (2020.01)
*G06F 17/11* (2006.01)
*G06V 20/64* (2022.01)
*G06V 10/25* (2022.01)
*G06V 10/764* (2022.01)
(Continued)

(52) U.S. Cl.
CPC ................ *F41G 3/06* (2013.01); *G01S 17/18* (2020.01); *G06F 17/11* (2013.01); *G06V 10/25* (2022.01); *G06V 10/50* (2022.01); *G06V 10/764* (2022.01); *G06V 20/52* (2022.01); *G06V 20/64* (2022.01)

(58) Field of Classification Search
CPC ...... G01S 17/18; G06V 20/64; G06V 10/751; F41G 3/06; G06F 17/11
See application file for complete search history.

(56) References Cited

U.S. PATENT DOCUMENTS

2004/0054473 A1* 3/2004 Shimomura ............ G06T 7/248
342/357.52
2013/0335724 A1* 12/2013 Mygland ................. G01S 17/10
356/4.01
(Continued)

FOREIGN PATENT DOCUMENTS

JP 4131392 B2 * 8/2008
KR 10-2011-0097053 A 8/2011
(Continued)

*Primary Examiner* — Luke D Ratcliffe
(74) *Attorney, Agent, or Firm* — Sughrue Mion, PLLC (57) ABSTRACT

An operating device and method for remotely controlling an arming device. The method includes confirming a tracking image at each firing time point of a laser beam transmitted by the range finder; based on an image correlation value of a target locked on by a tracking gate in the tracking image exceeding a threshold value, determining that the target is normally locked on; determining whether the laser beam from the range finder hits the target determined as being normally locked on based on a center value of the tracking image and a center value of the tracking gate; and based on the laser beam from the range finder hitting the target normally locked on, determining a range measurement value measured by the range finder as a true value of the target and determining other range measurement values as wrong measurement values.

16 Claims, 7 Drawing Sheets

(51) Int. Cl.
  *G06V 10/50*  (2022.01)
  *G06V 20/52*  (2022.01)

(56) References Cited

U.S. PATENT DOCUMENTS

2015/0108215 A1* 4/2015 Ehrlich .................... F41G 3/12
                                                     235/404
2019/0244536 A1* 8/2019 Tan ........................... F41J 5/00

FOREIGN PATENT DOCUMENTS

| KR | 10-1307272 | B1 | 9/2013 |
| KR | 10-1620983 | B1 | 5/2016 |
| KR | 10-1840540 | B1 | 3/2018 |

* cited by examiner

OPERATING DEVICE AND METHOD FOR REMOTE CONTROL OF ARMING DEVICE

CROSS-REFERENCE TO THE RELATED APPLICATION

This application is based on and claims priority to Korean Patent Application No. 10-2020-0013307, filed on Feb. 4, 2020, in the Korean Intellectual Property Office, the disclosure of which is incorporated by reference herein in its entirety.

BACKGROUND

1. Field

One or more embodiments relate to enhancement of reliability of range values with respect to a target measured by a remote weapon.

2. Description of Related Art

An image tracking device mounted on a mobile platform or a remote weapon may not be stable at aiming at a target when there is a disturbance in 3-axis roll, pitch, and yaw due to a movement of the mobile platform.

Also, even if a tracking gate of the image tracking device accurately locks onto the target or when obstructions appear in front of the target, because the remote weapon frequently measures ranges, there may be a difficulty in distinguishing between true values and false values of range measurement values with respect to the target.

SUMMARY

One or more embodiments include enhancement of reliability of range measurement values in a remote weapon device that is mounted on a mobile platform, a mobile vehicle, a mobile robot, or a mobile aircraft to perform range measurements with a laser range finder while tracking a static or moving target.

One or more embodiments include enhancement of reliability of range measurement values in a remote weapon device that is mounted on a static platform to perform range measurements with a laser range finder while tracking a static or moving target.

One or more embodiments include enhancement of reliability of range measurement values by filtering wrong measurement values when errors in measurement range occur due to internal disturbances or external disturbances in a remote weapon device.

One or more embodiments include enhancement of reliability of range measurement values by filtering wrong measurement values if a range finder incorrectly measures ranges as obstructions appear in front of a target tracked by a remote weapon device.

Additional aspects will be set forth in part in the description which follows and, in part, will be apparent from the description, or may be learned by practice of the embodiments of the disclosure.

According to an embodiment, there is provided an operating device configured to remotely control an arming device including a range finder and an imaging device, the operating device including a processor configured to: confirm a tracking image at each firing time point of a laser beam transmitted by the range finder; determine that a target is normally locked on based on an image correlation value of the target locked on by a tracking gate in the tracking image exceeding a threshold value; determine whether the laser beam from the range finder hits the target determined as being normally locked on based on a center value of the tracking image and a center value of the tracking gate; and determine a range measurement value measured by the range finder as a true value of the target and determine other range measurement values as wrong measurement values based on the laser beam from the range finder hitting the target normally locked on.

The processor is further configured to determine that the laser beam from the range finder hits the target normally locked on based on a first area of the laser beam hitting the target being greater than or equal to a first preset value.

The processor is further configured to: based on a second area where the laser beam overlaps the tracking gate being greater than or equal to a second preset value, classify and display the target as a range-measurable shape, and based on the second area where the laser beam overlaps the tracking gate being less than the second preset value, classify and display the target as a range-immeasurable shape.

The processor is further configured to, based on determining that the target is not normally locked on, determine whether a position of the target deviates from an aiming point of the range finder and whether obstructions appear in front of the target, and based on determining that the position of the target deviates from the aiming point of the range finder and the obstructions appear in front of the target, replace the wrong measurement values with range measurement values determined as the true value.

The processor is further configured to: based on the range finder continuously measuring the range measurement value, control the range finder to perform range measurements by transmitting the laser beam in preset cycles, and the processor is further configured to use a range measurement value used at an n–1th point in time instead of a range measurement value measured at an nth point in time by the range finder based on determining that the range measurement value measured at the nth point in time is a wrong measurement value.

The processor is further configured to: manually or automatically adjust a size of the tracking gate to a size of the target in the tracking image received from the imaging device, and based on the range finder continuously measuring the range measurement value, control the size of the tracking gate to automatically adjust on the basis of a field of view of the imaging device, horizontal and vertical resolutions of an image sensor used in the imaging device, and horizontal and vertical pixel numbers of the tracking gate.

The processor is further configured to: provide, on a display of the operating device, an interface for selecting a continuous measurement mode in which the range finder continuously measures the range measurement value, and based on the continuous measurement mode being activated, control the range finder to perform range measurements by transmitting the laser beam in preset cycles and receive, from the range finder, the measured range measurement values.

The arming device further includes a weapon device mounted on a mobile device.

According to an embodiment, there is provided a method of remotely controlling an arming device including a range finder and an imaging device, performed by an operating device receiving a range measurement value measured by the range finder and an image captured by the imaging device. The method includes confirming a tracking image at each firing time point of a laser beam transmitted by the range finder; based on an image correlation value of a target locked on by a tracking gate in the tracking image exceeding a threshold value, determining that the target is normally locked on; determining whether the laser beam from the range finder hits the target determined as being normally locked on based on a center value of the tracking image and a center value of the tracking gate; and based on the laser beam from the range finder hitting the target normally locked on, determining a range measurement value measured by the range finder as a true value of the target and determining other range measurement values as wrong measurement values.

The determining the image correlation value of the target further includes determining the image correlation value based on at least one of a sum of absolute differences (SAD), a sum of squared differences (SSD), or a normalized cross correlation (NCC).

The method further includes: based on determining that the target is not normally locked on, determining whether a position of the target deviates from an aiming point of the range finder and whether obstructions appear in front of the target, and based on determining that the position of the target deviates from the aiming point of the range finder and the obstructions appear in front of the target, replacing the wrong measurement values with the range measurement value determined as the true value.

Based on a first area of the laser beam hitting the target being greater than or equal to a first preset value, determining that the laser beam from the range finder is hitting the target normally locked on.

Based on a second area where the laser beam overlaps the tracking gate being greater than or equal to a second preset value, classifying and displaying the target as a range-measurable shape, and based on the second area where the laser beam overlaps the tracking gate being less than the second preset value, classifying and displaying the target as a range-immeasurable shape.

Based on the range finder continuously measuring the range measurement value, automatically adjusting a size of the tracking gate on the basis of a field of view of the imaging device, horizontal and vertical resolutions of an image sensor used in the imaging device, and horizontal and vertical pixel numbers of the tracking gate.

Based on the range finder continuously measuring the range measurement value, controlling the range finder to perform range measurements by transmitting the laser beam in preset cycles, and based on determining that a range measurement value measured at an nth point in time being the wrong measurement value, using a range measurement value used at an n−1th point in time instead of the range measurement value measured at the nth point in time.

The method further includes manually or automatically adjusting a size of the tracking gate to a size of the target in the tracking image received from the imaging device.

The method further includes: providing, on a display of the operating device, an interface for selecting a continuous measurement mode in which the range finder continuously measures the range measurement value, and based on the continuous measurement mode being activated, controlling the range finder to perform range measurements by transmitting the laser beam in preset cycles and receiving, from the range finder, the range measurement values.

The processor is further configured to determine the image correlation value of the target based on at least one of a sum of absolute differences (SAD), a sum of squared differences (SSD), or a normalized cross correlation (NCC).

The processor is further configured to calculate a hit rate of the laser beam based on a distance between the center value of the tracking image and the center value of the tracking gate, and a number of pixels disposed in a third area determined by multiplying a length of the distance and a width of the distance.

According to an embodiment, there is provided a non-transitory computer readable medium storing a computer program including at least one executable instruction, when executed by a processor, causes a processor to perform a method of remotely controlling an arming device according to various embodiments.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Embodiments will now be described in detail with reference to the accompanying drawings, in which like reference numerals refer to like elements. The embodiments may have different forms and should not be construed as limiting the scope of the disclosure. Accordingly, the embodiments are described, by referring to the accompanying drawings, to explain various aspects of the disclosure. As used herein, the term "and/or" may include any and all combinations of one or more of the associated items.

The disclosure will now be described more fully with reference to the accompanying drawings, in which example embodiments of the disclosure are shown. The disclosure may, however, be embodied in many different forms and should not be construed as being limited to the embodiments set forth herein. Rather, these embodiments are provided so that the disclosure will be easily understood by those skilled in the art, and will be defined by the scope of the appended claims. The terminology used herein is for the purpose of describing the embodiments only and is not intended to limit the scope of example embodiments. As used herein, the singular forms are intended to include the plural forms, unless the context clearly indicates otherwise. The terms "comprise" and/or "comprising" may indicate the presence of stated features, integers, steps, operations, elements, and/or components, but do not preclude the presence or addition of one or more other features, integers, steps, operations, elements, components, and/or groups thereof.

Although the terms first, second etc. may be used herein to describe various elements or components, these elements or components should not be limited by these terms. These terms may be used only to distinguish one element or component from another element or component.

Figure 1:
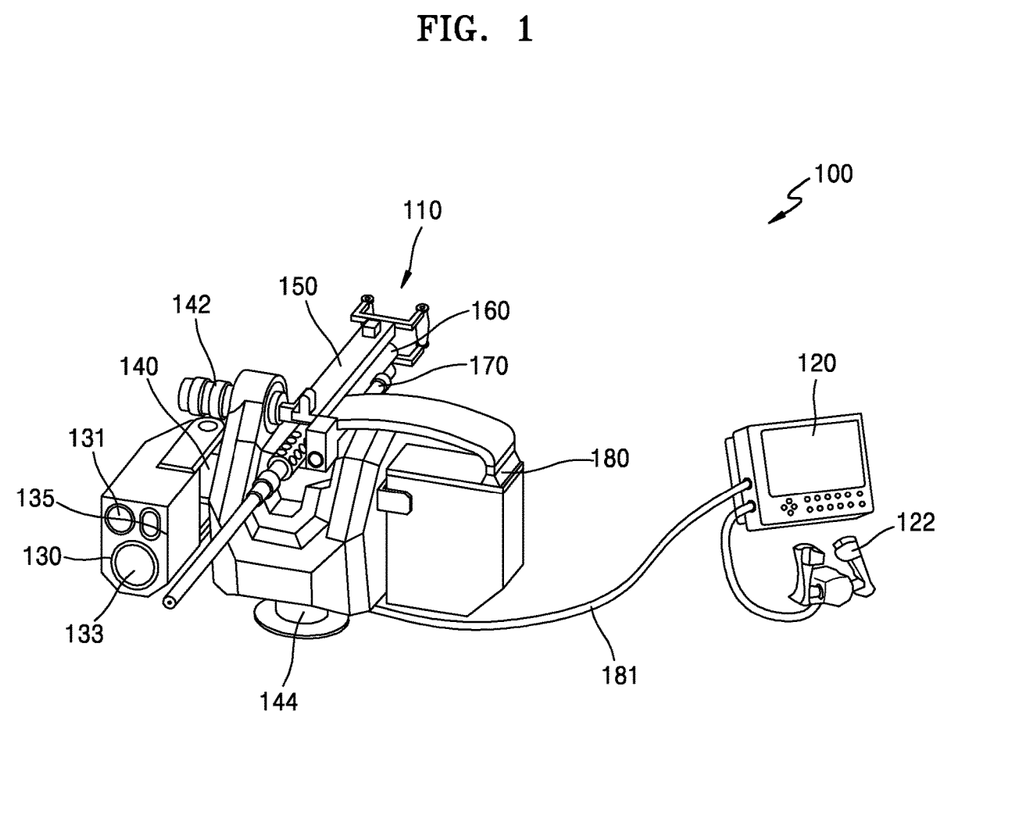
FIG. 1 illustrates an arming device and an operating device according to an embodiment.

FIG. 1 illustrates an arming device and an operating device according to an embodiment. In an embodiment, a remote weapon system 100 may include an operating device 120, a joystick 122, and an arming device 110.

The arming device 110 may include an imaging device 130 and a range finder 135. The range finder 135 may be embodied separately from the imaging device 130 or may be integrated into the imaging device 130.

The arming device 110 may be formed in various forms. For example, the arming device 110 may include all types of devices capable of firing bullets, shells, or the like.

According to an embodiment, the arming device 110 may include a support 170 on which a weapon is mounted, a trigger solenoid 160 configured to trigger the weapon, an ammunition supply device 180 that supplies ammunition to the weapon and loads the ammunition, the imaging device 130 that observes daytime and night-time targets and measures ranges, an image driver 140 that drives the imaging device 130, an elevation driver 142 that elevates the support 170 on which a firearm 150 is mounted, and a rotation driver 144 that rotates the arming device 110.

The imaging device 130 may refer to a device that captures front images and measures ranges according to an operation of the arming device 110, and transmits, to the operating device 120, image signals received from a TV camera 131, an IR camera 133, and the range finder 135. Also, the imaging device 130 may transmit image signals received from an image capturing element or an image sensor of the TV camera 131 or the IR camera 133 and range measurement values measured by the range finder 135. A TV camera and an IR camera may be modified into or replaced with various types of other elements for capturing images.

An aiming point of the range finder 135 may be aligned with a center of an image of the TV camera 131 and the IR camera 133. Therefore, if a target is located at the center of the image captured by the TV camera 131 and the IR camera 133, it means that the target is matched to the aiming point of the range finder 135 and is matched to a center of a laser beam used by the range finder 135.

A gyro sensor may be mounted on the arming device 110 to measure angular velocities in roll, pitch, and yaw axis directions entering a remote weapon and perform rotation, yaw and pitch 2-axis stabilization control for external disturbances through a control device. Stabilization control is performed for the arming device 100 in rotation, yaw and pitch directions to keep the firearm 150 in a preset direction on the basis of angular velocity values of the roll, pitch, and yaw axis directions measured by the gyro sensor.

The operating device 120 may be embodied in the form of a terminal including a display, a memory and a processor. The operating device 120 may receive from the arming device 110 daytime and nighttime observation images, range measurement value information, and state information about the arming device 110. Although not described, the processor may include a central processing unit (CPU), a microprocessor, or the like that performs respective functions described later in reference to FIG. 2.

The operating device 120 may store rotation information, such as yaw and pitch of a particular area acquired by driving the elevation driver 142 and the rotation driver 144, position values of the imaging device 130, field of view (FOV) of images, the range measurement values, and the like, which are received from the arming device 110.

The operating device 120 may also display a target or objects through the display, may operate and control the arming device 110 and the joystick 122, and may include a tracking device therein. An operator may manipulate the joystick 122 to drive the elevation driver 142 and the rotation driver 144 of the arming device 110.

According to an embodiment, the remote weapon system 100 rotates the arming device 110 or drives the arming device 110 in yaw and pitch directions to position the target on a center of a line of sight and then selects the tracking device included in the imaging device 130 in a tracking mode to lock on the target. In this case, the line of sight may be changed by a tracking gate.

Figure 2:
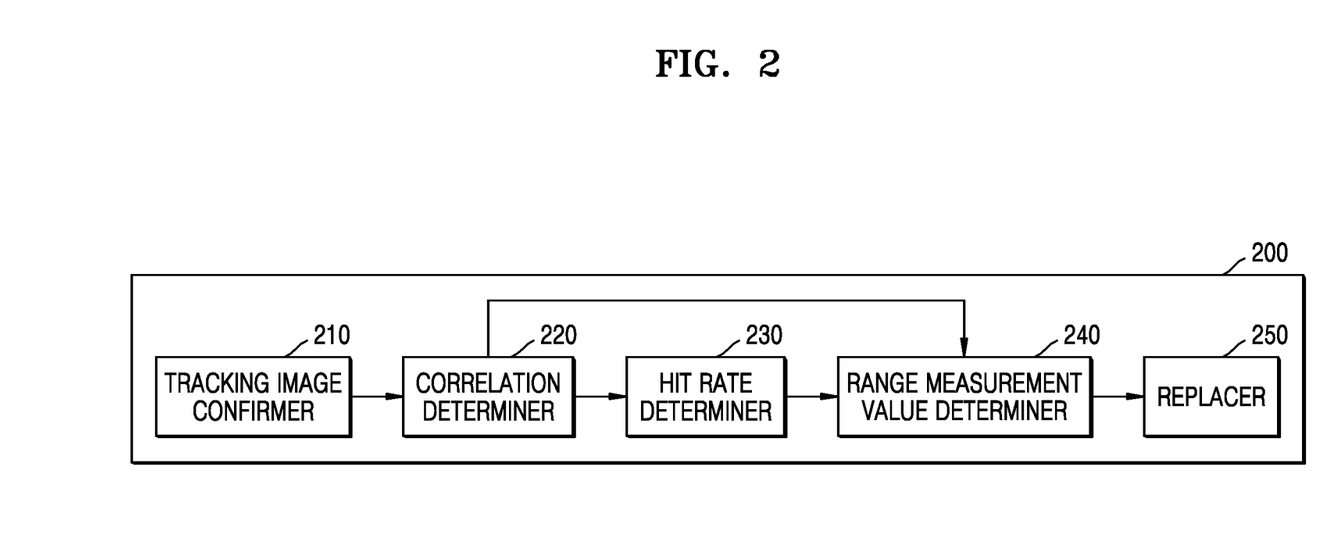
FIG. 2 illustrates an internal structure of an operating device according to an embodiment.

FIG. 2 illustrates an internal structure of an operating device 200 according to an embodiment.

The operating device 200 may include a plurality components such as a tracking image confirmer 210, a correlation determiner 220, a hit rate determiner 230, and a range measurement value determiner 240, and a replacer 250 that may be implemented by the processor as described above in reference to FIG. 1. Further, it is noted that at least one of these components may be embodied as various numbers of hardware, software and/or firmware structures that execute respective functions described below. For example, at least one of these components may use a direct circuit structure, such as a memory, an internal processor, a logic circuit, a look-up table, etc. that may execute the respective functions through controls of the processor described above. Also, at least one of these components may be specifically embodied by a module, a program, or a part of code, which contains one or more executable instructions for performing the respective functions, and executed by the processor.

If a range measurement mode of a range finder is set to a continuous measurement mode, the operating device 200 may continuously measure ranges in preset cycles.

In this case, the tracking image confirmer 210 confirms a tracking image at each firing time point of a laser beam transmitted by the range finder.

Figure 5:
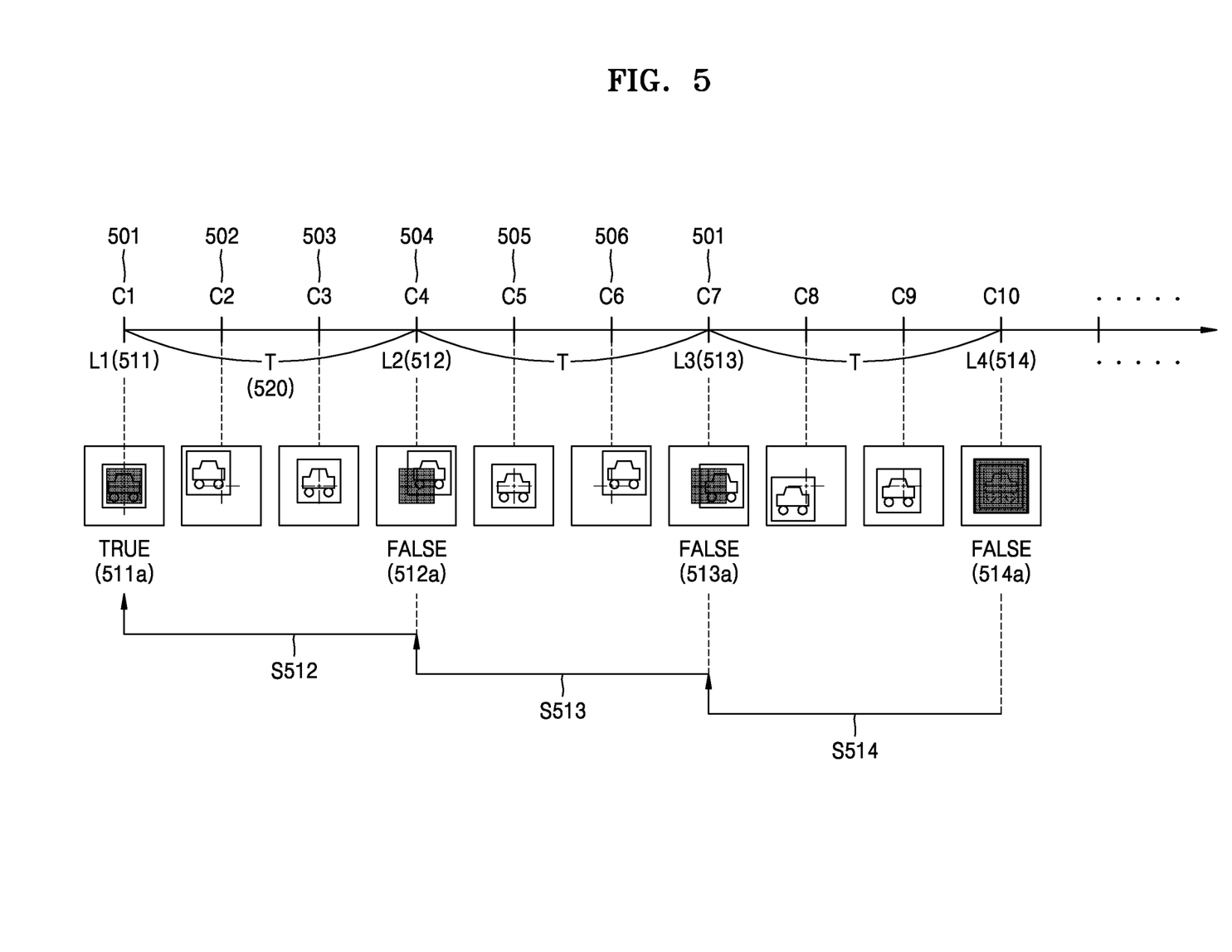
FIG. 5 illustrates an example of determining of whether range measurement values are true or false by a range measurement value determiner according to an embodiment.

According to an embodiment, an imaging device (130 of FIG. 1) tracks a target, and cycles in which the imaging device captures images may be different from cycles in which the range finder measures ranges. Referring to FIG. 5, the imaging device tracks a target and captures an image in shorter cycles (e.g., C1 501, C2 502, C3 503, C4 504, C5 505, C6 506, and C7 507) than a preset time T 520 of the range finder.

The tracking image confirmer 210 confirms a tracking image at respective firing time points, for example, L1 511, L2 512, L4 513, L 514 of laser beams transmitted by the range finder.

According to an embodiment, the range finder performs a range measurement at each preset time T 520 and transmits the measured range measurement value to the operating device 200, regardless of whether the imaging device tracks the target. Since the operating device 200 receives the range measurement value measured from the range finder regardless of whether the imaging device tracks the target, it may be difficult for the operating device 200 to determine whether the received range measurement value is true or false.

To solve this, the correlation determiner 220 determines that the target is normally locked on if an image correlation value of the target locked on by a tracking gate in the tracking image exceeds a threshold value. The threshold value may be input by an operator or may use a preset value.

If a two-dimensional correlation value falls below the threshold value such as if the lock-on of the target is missed, if a position of the target deviates from an aiming point of the range finder, and if obstructions appear in front of the target, the correlation determiner 220 determines the range measurement value measured by the range finder as a wrong measurement value or a false value.

The correlation determiner 220 may use a correlation determination technique including the sum of absolute differences (SAD), the sum of squared differences (SSD), the normalized cross correlation (NCC), and the like to determine whether an image correlation value exceeds a threshold value.

The correlation determiner 220 tracks a target in a position having the highest correlation value as the target, on the basis of correlation values calculated by using the correlation determination technique. Here, although the target has the highest correlation value in a search area, when the highest correlation value is smaller than or equal to the threshold value, the correlation determiner 220 determines the range measurement value measured by the range finder as a false value to enhance the tracking performance. The greatest value of the correlation value may be 1, and for example, the threshold value may be greater than or equal to 0.3, but may be set to any value between 0 and 1.

$$SAD = \sum_{x,y}[f(x, y) - t(x, y)] \text{ and} \tag{1}$$

$$SSD = \sum_{x,y}[f(x, y) - t(x, y)]^2, \tag{2}$$

respectively.

$$NCC = \frac{1}{n}\sum_{x,y}\frac{(f(x, y) - \bar{f})(t(x, y) - \bar{t})}{\sigma_f \sigma_t} \tag{3}$$

Here, definitions of respective variables are as follows.
n: the number of pixels
f(x,y): (x,y) pixels of a sub-image that is part of a source image, where the source image refers to an image that is being captured by the imaging device.
t(x,y): (x,y) pixels of a template image, where the template image refers to an image displayed on the tracking gate.
f bar: average value of sub-image pixels
t bar: average value of template image pixels
$\sigma_f$: standard deviation of sub-image pixels
$\sigma_t$: standard deviation of template image pixels According to an embodiment, the correlation determiner 220 may calculate a moving path and a moving speed of the target and predict a range measurement value in a predetermined cycle to update the range measurement value, on the basis of a moving path and a moving speed of a mobile platform on which an imaging device or a remote weapon is mounted, inclined angles of the mobile platform in roll, pitch, and yaw directions, a rotation or elevation angle of the remote weapon, and a range measurement value measured in a previous cycle, if the two-dimensional image correlation value is less than the threshold value.

The hit rate determiner 230 determines whether the laser beam from the range finder hits the target determined as being normally locked on by the correlation determiner 220, by using a center value of the tracking image and a center value of the tracking gate. Here, a range measurement value of the range finder may be returned if a size or a signal level of the laser beam that is transmitted from the range finder, hits the target, reflects from the target, and is incident upon a receiving optical system of the range finder, is greater than or equal to a minimum detectable signal level of a detector installed in the range finder. The Equation (4) is used to calculate the range measurement value as follows.

$$Pr = \frac{P_0 \times T_{opt} \times D_{rx}^2 \times \rho \times T_{atm}}{4R^2} \times \left(1 - e^{\frac{-2S^2}{(\alpha R)^2}}\right) \geq MDS \tag{4}$$

Here, definitions of respective variables are as follows.
Pr: laser beam reflecting signal incident on receiving optical system
Po: laser beam output signal
$T_{opt}$: transmitting and receiving optical transmittance
$D_{rx}$: receiving optical system diameter
ρ: target reflectance
$T_{atm}$: atmospheric transmittance
S: target size
α: laser beam diameter
R: target range
MDS: detector minimum detectable signal level Referring to the Equation (4), a range-measurable value of the range finder may be affected by environmental factors such as the target reflectance p, the atmospheric transmittance $T_{atm}$, and the like. For example, if the laser beam hits the target by 20% or more, for example, a surface area of the target, the hit rate determiner 230 may exclude a wrong measurement due to a background behind the target and determines that the laser beam properly hit the target determined as being normally locked on by the correlation determiner 220. If the hit rate determiner 230 determines that the laser beam hits the target by a predetermined threshold, the hit rate determiner 230 determines a corresponding range measurement value as a true value, or otherwise, determines the corresponding measurement value as a false value.

According to an embodiment, the hit rate determiner 230 may determine whether a range measurement value is true or false, in consideration of a ratio of an area of the laser beam hitting the target, a size of the tracking gate, and an error value from a center of a camera image to a center of the tracking gate.

An embodiment of calculating a hit rate at which a laser beam from a range finder hits a target will now be described with reference to FIGS. 3 and 4.

A reference axis of a range finder may be commonly physically aligned with a TV camera, an IR camera, or a charge-coupled device (CCD) or complementary metal-oxide semiconductor (CMOS) sensor mounted in an imaging device. Specifically, a center of a laser beam from the range finder is aligned to be matched to a center of an image of the TV camera and the IR camera.

Figure 3:
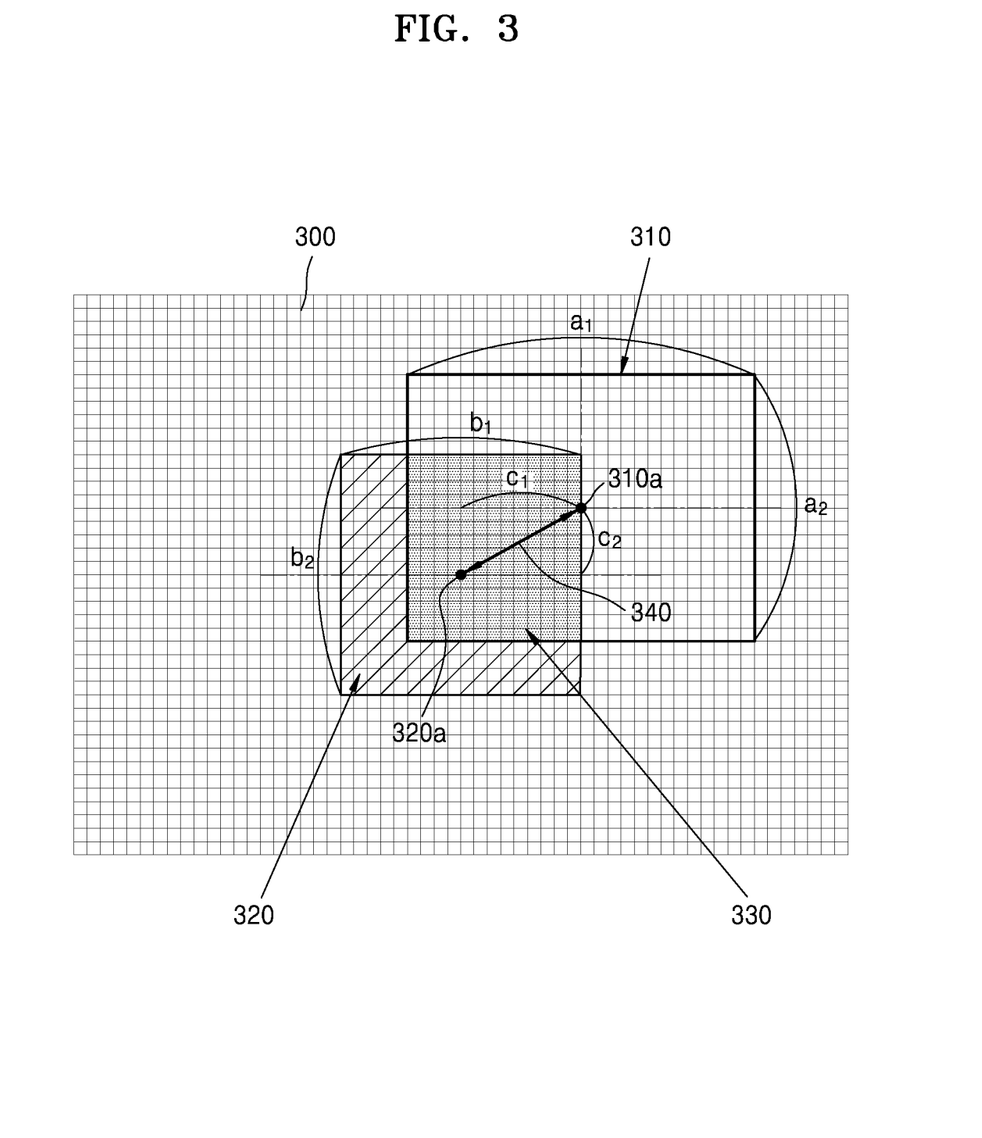
FIG. 3 illustrates a schematic diagram of an example of determining of a hit rate by a hit rate determiner according to an embodiment.

In FIG. 3, if pixel number a1*a2 of a tracking gate 310 of a TV camera 300 or IR camera of an imaging device is 1280×960 pixels, and horizontal×vertical field of view of the TV camera 300 is 4.0°×3.0°, resolution per pixel of the TV camera 300 or IR camera is 0.003125°/pixels. If a size of a laser beam diameter 320 is 1 mrad×1 mrad, pixel number b1*b2 of the laser beam diameter 320 is calculated as 18 pixels×18 pixels. As an example shown in FIG. 3, if a laser beam hits a target displayed in the tracking gate 310, a hit rate of the laser beam may be calculated as follows.

First, a range between a center point 310a of the tracking gate 310 and a center point 320a of the laser beam may be calculated on the basis of pixel number c1*c2, i.e., 9 pixels*5 pixels. In this case, the hit rate of the laser beam is calculated as follows.

$$\frac{\left(\frac{a_1+b_1}{2}-c_1\right)*\left(\frac{a_2+b_2}{2}-c_2\right)}{b_1*b_2}*100\% = \quad (5)$$

$$\frac{\left(\frac{26+18}{2}-9\right)*\left(\frac{20+18}{2}-5\right)}{18*18}*100\%$$

Figure 4:
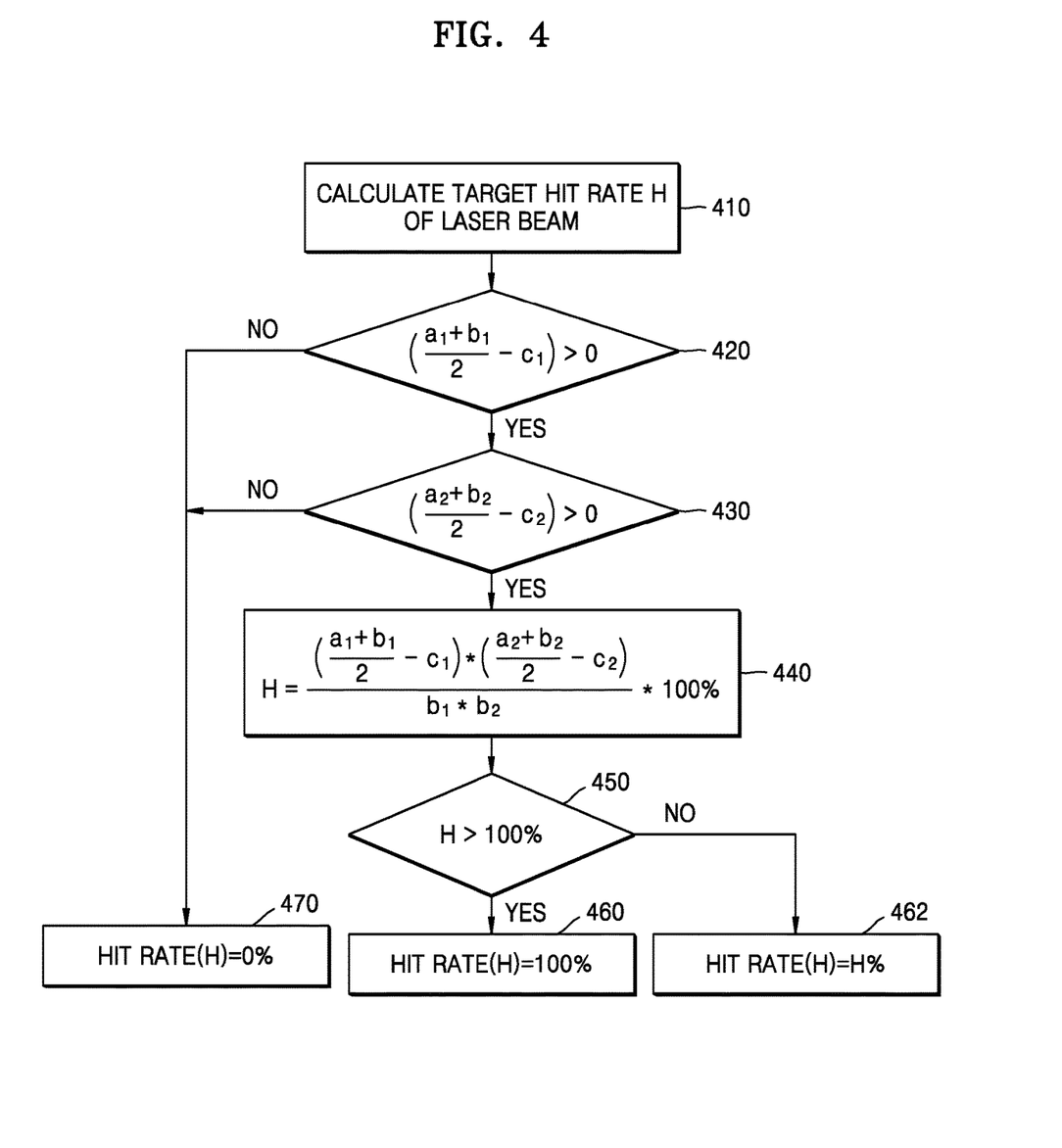
FIG. 4 illustrates a flowchart for determining a hit rate by a hit rate determiner according to an embodiment.

An operation 410 of calculating a hit rate H at which a laser beam from a range finder hits a target, by the hit rate determiner 230, is illustrated in FIG. 4.

In operation S420, the hit rate determiner 230 determines whether $$\left(\frac{a_1+b_1}{2}-c_1\right)$$

value is greater than 0. If not greater, the hit rate determiner 230 calculates the hit rate H as H=0% in operation 470, and if greater, determines whether $$\left(\frac{a_2+b_2}{2}-c_2\right)$$

value is greater than 0 in operation 430. If not greater, the hit rate determiner 230 calculates the hit rate H as H=0% in operation 470, and if greater, calculates $$\frac{\left(\frac{a_1+b_1}{2}-c_1\right)*\left(\frac{a_2+b_2}{2}-c_2\right)}{b_1*b_2}*100\%$$

value in operation 440. In this case, if a value of the hit rate H is greater than 100% in operation 450, the hit rate determiner 230 calculates the hit rate H as H=100% in operation 460, and otherwise, calculates the hit rate H as H=H % in operation 462.

According to an embodiment, if the value of the hit rate H or an area where the laser beam overlaps the tracking gate is greater than or equal to a preset value, the operating device 200 may display a corresponding target as a range-measurable shape. Alternatively, if the value of the hit rate H or the area where the laser beam overlaps the tracking gate is less than the preset value, the operating device 200 may classify and display the corresponding target as a range-immeasurable shape.

If the hit rate determiner 230 determines that the laser beam from the range finder hits the target normally locked on, the range measurement value determiner 240 determines a range measurement value as a true value and determines other range measurement values as wrong measurement values. If the correlation determiner 220 determines a range measurement value as being false in a first stage, the range measurement value determiner 240 immediately determines the corresponding range measurement value as a false value or a wrong measurement value.

If the correlation determiner 220 determines the range measurement value as being true in the first stage, in the second stage, the hit rate determiner 230 determines that the laser beam from the range finder hits the target normally locked on, and thus the range measurement value determiner 240 finally determines the range measurement value as being true. Otherwise, the range measurement value determiner 240 determines the range measurement value as being false.

If the range measurement value is determined as being false through the range measurement value determiner 240, the replacer 250 subsequently replaces the range measurement value determined as being false with a range measurement value that is determined as being true. An example of replacing a range measurement value that is incorrectly measured will now be described with reference to FIGS. 5 and 7.

Figure 7:
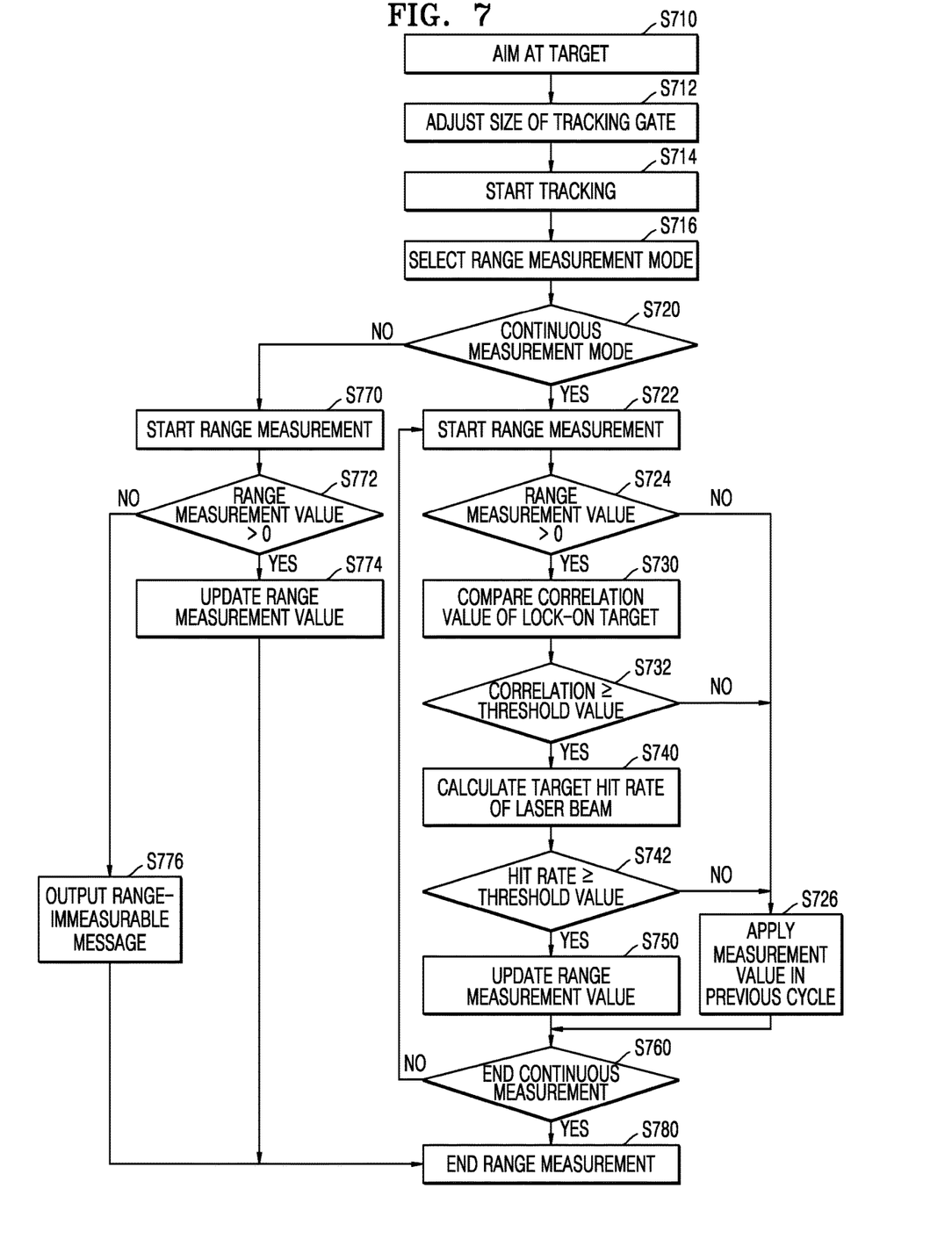
FIG. 7 illustrates a flowchart of a method performed by an operating device for remotely controlling an arming device according to an embodiment.

If a range finder measures a range to a target at the firing time point L1 511, an operating device aims at the target in operation S710. In operation S712, the operating device adjusts a size of a tracking gate to a size of the target. The operating device may manually or automatically adjust the size of the tracking gate to the size of the target in a tracking image received from an imaging device. Also, if the operating device performs a continuous measurement mode, the size of the tracking gate may be automatically adjusted on the basis of a field of view of the imaging device, horizontal and vertical resolution of an image sensor used in the imaging device, and horizontal and vertical pixel number of the tracking gate.

If the imaging device starts to track the target in operation S714, the operating device may select a mode for measuring a range to the target in operation S716. The operating device may provide an interface for selecting the mode to measure the range and may provide an interface for selecting the continuous measurement mode. If an operator does not select the continuous measurement mode in operation S720, and a range measurement value acquired by measuring a range in operation S770 is not greater than 0 in operation S772, the range finder outputs a range-immeasurable message in operation S776, and if the range measurement value is greater than 0 in operation S772, the range finder updates the range measurement value in operation S774.

If the operator selects the continuous measurement mode in operation S720, and a range measurement value measured in operation S722 is greater than 0 in operation S724, the operating device determines whether a two-dimensional correlation value of a lock-on target exceeds a preset threshold value Th1 in operations S730 and S732.

If the two-dimensional correlation value of the lock-on target exceeds the preset threshold value Th1, the operating device calculates a hit rate H of a laser beam that hits the target exceeding the threshold value Th1 in operation S740. If the hit rate H is greater than or equal to a preset threshold value $Th_{\_h}$ in operation S742, the operating device updates the range measurement value in operation S750. However, if the hit rate H is less than the preset threshold value $Th_{\_h}$ in operation S742, the operating device applies a range measurement value in a previous cycle in operation S726.

In operation S760, the operating device determines whether to end the continuous measurement. If the operating device determines to continue the continuous measurements, the operating device starts the range measurement (operation S722) again and repetitively performs the determination as to whether the range measurement value is true or false and a replacement of the range measurement value. However, if the operating device determines to end the continuous measurements, the continuous measurement ends in operation S780.

Referring to FIG. 5, the range finder measures a range to a target at the firing time point L1 511, calculates a correlation and a hit rate of the laser beam, respectively, and, if a range measurement value satisfies both the correlation and the hit rate, the range finder determines the range measurement value as being true 511a.

According to an embodiment, the range finder may remeasure a range to the target at the next firing time point L2 512, if a range measurement value satisfies the correlation of the target, but does not satisfy the hit rate. Here, the range finder may determine the range measurement value as being false 512a, and replace the range measurement value with the range measurement value measured at the previous firing time point L1 511 to update the range measurement value in S512.

Furthermore, the range finder may also remeasure a range to the target at the firing time point L3 513, if a range measurement value satisfies the correlation of the target, but does not satisfy the hit rate. Here, the range finder may determine the range measurement value as being false 513a, and replace the range measurement value with the range measurement value used at the previous firing time point L 512 to update the range measurement value in S513.

Furthermore, the range finder may remeasure a range to the target at the firing time point L4 514. For example, if obstructions pass in front of the target and thus a range measurement value does not satisfy the correlation of the target, the range finder may immediately determine the range measurement value as being false 514a regardless of the determination of the hit rate, and replace the range measurement value with the range measurement value used at the previous firing time point L3 513 to update the range measurement value in S514.

Figure 6:
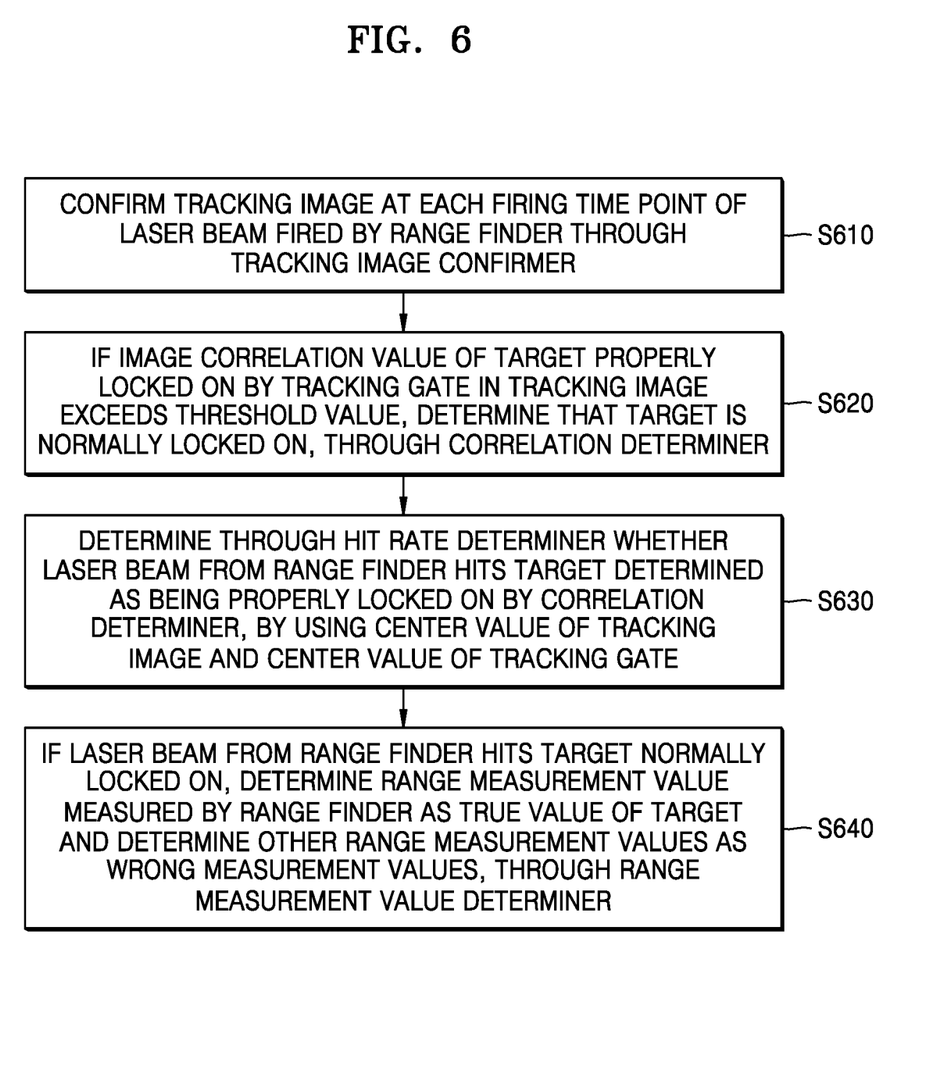
FIG. 6 illustrates a flowchart of a method performed by an operating device for remotely controlling an arming device according to an embodiment.

FIG. 6 illustrates a flowchart of a method of remotely controlling an arming device by an operating device according to an embodiment.

In operation S610, the operating device receives a range measurement value measured by a range finder and an image captured by an imaging device and confirms a tracking image through a tracking image confirmer at each firing time point of a laser beam transmitted by the range finder.

In operation S620, if an image correlation value of a target locked on by a tracking gate in the tracking image exceeds a threshold value, the operating device determines through a correlation determiner that the target is normally locked on. In operation S630, if the target is normally locked on, a hit rate determiner determines whether the laser beam from the range finder hits the target determined as being normally locked on by the correlation determiner, by using a center value of the tracking image and a center value of the tracking gate.

In operation S640, if the laser beam from the range finder hits the target normally locked on, the operating device determines a range measurement value measured by the range finder as a true value of the target and determines other range measurement values as wrong measurement values or false values through a range measurement value determiner.

In addition, the embodiments of the disclosure may include computer instructions stored in a non-transitory computer readable medium for performing the method of remotely controlling the arming device by the operating device. The non-transitory computer-readable medium may not be a medium that stores data therein for a while, such as a register, a cache, a memory, or the like, but means a medium that semi-permanently stores data therein and is readable by the machine. A specific example of the non-transitory computer-readable medium may include a compact disc (CD), a digital versatile disc (DVD), a hard disk, a Blu-ray disk, a universal serial bus (USB), a memory card, or a ROM. However, the embodiments are not limited thereto.

According to an embodiment, a remote weapon system has an effect of enhancing reliability of range measurement values in a remote weapon device that is mounted on a mobile platform, a mobile vehicle, a mobile robot, or a mobile aircraft to perform range measurements with a laser range finder while tracking a static or moving target.

According to one or more embodiments, an operating device has an effect of enhancing reliability of range measurement values by not using wrong measurement values when measuring ranges due to internal disturbances or external disturbances in a remote weapon device.

According to one or more embodiments, an effect of enhancing reliability of range measurement values may be acquired by not using wrong measurement values if a range finder incorrectly measures ranges as obstructions appear in front of a target tracked by a remote weapon device.

It should be understood that embodiments described herein should be considered in as examples to explain the embodiments of the disclosure and do not limit the scope of the disclosure. Descriptions of features or aspects within each embodiment should be considered as available for other similar features or aspects in other embodiments. While one or more embodiments have been described with reference to the accompanying drawings, it will be understood by those of ordinary skill in the art that various changes in form and details may be made therein without departing from the spirit and scope of the disclosure as defined by the following claims.

What is claimed is:

1. An operating device configured to remotely control an arming device comprising a range finder and an imaging device, the operating device comprising a processor configured to:

confirm a tracking image at each firing time point of a laser beam transmitted by the range finder;

determine that a target is normally locked on based on an image correlation value of the target locked on by a tracking gate in the tracking image exceeding a threshold value;

determine whether the laser beam from the range finder hits the target determined as being normally locked on based on a center value of the tracking image and a center value of the tracking gate; and determine a range measurement value measured by the range finder as a true value of the target based on the image correlation value exceeding the threshold value and the laser beam from the range finder hitting the target normally locked on, and determine other range measurement values as wrong measurement values based on the image correlation value being less than or equal to the threshold value, wherein the processor is further configured to determine that the laser beam from the range finder hits the target normally locked on based on a first area of the laser beam hitting the target being greater than or equal to a first preset value, and wherein the processor is further configured to:

based on a second area where the laser beam overlaps the tracking gate being greater than or equal to a second preset value, classify and display the target as a range-measurable shape, and based on the second area where the laser beam overlaps the tracking gate being less than the second preset value, classify and display the target as a range-immeasurable shape.

2. The operating device of claim 1, wherein the processor is further configured to:

based on determining that the target is not normally locked on, determine whether a position of the target deviates from an aiming point of the range finder, and whether obstructions appear in front of the target, and based on determining that the position of the target deviates from the aiming point of the range finder and the obstructions appear in front of the target, replace the wrong measurement values with the range measurement value determined as the true value.

3. The operating device of claim 1, wherein the processor is further configured to, based on the range finder continuously measuring the range measurement value, control the range finder to perform range measurements by transmitting the laser beam in preset cycles, and wherein the processor is further configured to use a range measurement value used at an (n−1)th point in time instead of a range measurement value measured at an nth point in time by the range finder based on determining that the range measurement value measured at the nth point in time is a wrong measurement value.

4. An operating device configured to remotely control an arming device comprising a range finder and an imaging device, the operating device comprising a processor configured to:

confirm a tracking image at each firing time point of a laser beam transmitted by the range finder;

determine that a target is normally locked on based on an image correlation value of the target locked on by a tracking gate in the tracking image exceeding a threshold value;

determine whether the laser beam from the range finder hits the target determined as being normally locked on based on a center value of the tracking image and a center value of the tracking gate; and determine a range measurement value measured by the range finder as a true value of the target and determine other range measurement values as wrong measurement values based on the laser beam from the range finder hitting the target normally locked on, wherein the processor is further configured to:

manually or automatically adjust a size of the tracking gate to a size of the target in the tracking image received from the imaging device, and based on the range finder continuously measuring the range measurement value, control the size of the tracking gate to automatically adjust on the basis of a field of view of the imaging device, horizontal and vertical resolutions of an image sensor used in the imaging device, and horizontal and vertical pixel numbers of the tracking gate.

5. The operating device of claim 1, wherein the processor is further configured to:

provide, on a display of the operating device, an interface for selecting a continuous measurement mode in which the range finder continuously measures the range measurement value, and based on the continuous measurement mode being activated, control the range finder to perform range measurements by transmitting the laser beam in preset cycles and receive, from the range finder, the measured range measurement value.

6. The operating device of claim 1, wherein the arming device further comprises a weapon device mounted on a mobile device.

7. A method of remotely controlling an arming device comprising a range finder and an imaging device, performed by an operating device receiving a range measurement value measured by the range finder and an image captured by the imaging device, the method comprising:

confirming a tracking image at each firing time point of a laser beam transmitted by the range finder;

based on an image correlation value of a target locked on by a tracking gate in the tracking image exceeding a threshold value, determining that the target is normally locked on;

determining whether the laser beam from the range finder hits the target determined as being normally locked on based on a center value of the tracking image and a center value of the tracking gate; and based on the image correlation value exceeding the threshold value and the laser beam from the range finder hitting the target normally locked on, determining a range measurement value measured by the range finder as a true value of the target and determining other range measurement values as wrong measurement values based on the image correlation value being less than or equal to the threshold value, wherein, based on a first area of the laser beam hitting the target being greater than or equal to a first preset value, determining that the laser beam from the range finder is hitting the target normally locked on, wherein, based on a second area where the laser beam overlaps the tracking gate being greater than or equal to a second preset value, classifying and displaying the target as a range-measurable shape, and wherein, based on the second area where the laser beam overlaps the tracking gate being less than the second preset value, classifying and displaying the target as a range-immeasurable shape.

8. The method of claim 7, wherein the determining the image correlation value of the target further comprises determining the image correlation value based on at least one of a sum of absolute differences (SAD), a sum of squared differences (SSD), or a normalized cross correlation (NCC).

9. The method of claim 7, further comprising:

based on determining that the target is not normally locked on, determining whether a position of the target deviates from an aiming point of the range finder and whether obstructions appear in front of the target, and based on determining that the position of the target deviates from the aiming point of the range finder and the obstructions appear in front of the target, replacing the wrong measurement values with the range measurement value determined as the true value.

10. The method of claim 7, wherein, based on the range finder continuously measuring the range measurement value, automatically adjusting a size of the tracking gate on the basis of a field of view of the imaging device, horizontal and vertical resolutions of an image sensor used in the imaging device, and horizontal and vertical pixel numbers of the tracking gate.

11. The method of claim 7, wherein, based on the range finder continuously measuring the range measurement value, controlling the range finder to perform range measurements by transmitting the laser beam in preset cycles, and wherein, based on determining that a range measurement value measured at an nth point in time being a wrong measurement value, using a range measurement value used at an n−1th point in time instead of the range measurement value measured at the n-th point in time.

12. The method of claim 7, further comprising manually or automatically adjusting a size of the tracking gate to a size of the target in the tracking image received from the imaging device.

13. The method of claim 7, further comprising:
providing, on a display of the operating device, an interface for selecting a continuous measurement mode in which the range finder continuously measures the range measurement value, and
based on the continuous measurement mode being activated, controlling the range finder to perform range measurements by transmitting the laser beam in preset cycles and receiving, from the range finder, the measured range measurement value.

14. The operating device of claim 1, wherein the processor is further configured to determine the image correlation value of the target based on at least one of a sum of absolute differences (SAD), a sum of squared differences (SSD), or a normalized cross correlation (NCC).

15. The operating device of claim 1, wherein the processor is further configured to calculate a hit rate of the laser beam based on a distance between the center value of the tracking image and the center value of the tracking gate, and a number of pixels disposed in a third area determined by multiplying a length of the distance and a width of the distance.

16. A non-transitory computer readable medium storing a computer program comprising at least one executable instruction, when executed by a processor, causes the processor to perform a method of remotely controlling an arming device according to claim 7.

* * * * *